United States Patent Office 3,291,845
Patented Dec. 13, 1966

3,291,845
LIQUID OXYALKYLATION PRODUCTS OF HIGH-MELTING POLYOLS AND COMPOSITIONS UTILIZING SAME
Kermit Donald Longley, Park Forest, and Carl Bernstein, Deerfield, Ill., assignors to Witco Chemical Company, Inc., New York, N.Y., a corporation of Delaware
No Drawing. Filed Apr. 5, 1963, Ser. No. 270,798
11 Claims. (Cl. 260—615)

This application is a continuation-in-part of our application Serial No. 829,525, filed July 27, 1959, now abandoned.

Our invention relates to new and useful improvements in the preparation of normally liquid oxyalkylation products of high-melting polyols and to compositions utilizing the same, notably polyesters and polyurethanes. By the term "normally liquid" we mean liquid at ordinary room temperatures, for instance, from about 25 to 30° C.

Oxyalkylated polyols, notably reaction products of polyols with ethylene oxide or propylene oxide or both ethylene oxide and propylene oxide, in varying mol ratios of the polyol to the alkylene oxide, broadly have long been known in the art and have been suggested and utilized for a variety of purposes, including the production of non-ionic surfactants, and as polyethers and as intermediates for the preparation of polyesters for use in the production of urethane polymers, including both flexible and rigid polyurethane foams, particularly the latter.

Among the commonly employed polyols which are utilized in the production of liquid oxyalkylated derivatives thereof are, for instance, glycerin, ethylene glycol, diethylene glycol, propylene glycol, diglycerol and higher polyglycerols, sorbide, and the like. Such polyols can readily be reacted with ethylene oxide or propylene oxide or mixtures thereof, usually under pressure in autoclaves and the like and in the presence of catalysts, commonly alkalies although acids, too, have been utilized, by techniques and procedures which have long been well known in the art. No particular difficulties are encountered in carrying out such reactions.

If, however, attempts are made to apply such oxyethylation or oxypropylation or other oxyalkylation reactions to high-melting polyols, for instance, mannitol, erythritol, pentaerythritol, dipentaerythritol, tripentaerythritol, higher pentaerythritols and mixtures thereof, trimethylolethane, (1,3-propane-diol-2-hydroxy-methyl-2-methyl), and other polyols melting above 200° C., for the production of liquid oxyalkylation products, severe problems arise, particularly in relation to operational hazards. It is desirable that the oxyalkylation reaction be carried out in the liquid phase. Hence, in those cases where the polyols which are to be oxyalkylated are solid at room temperatures, it is necessary to melt said polyols by heating them to somewhat above their melting points. Unfortunately, in the case of those polyols which melt at temperatures of 200° C. or in excess of 200° C., reactions at such elevated temperatures between the molten polyol and the alkylene oxide, particularly where the latter is used in gaseous form under pressure, are difficult to control and are dangerous to carry out because of the possibilities of self-ignition, particularly in the case of ethylene oxide, and the hazards of explosions. While it is common practice to carry out oxyalkylation reaction at temperatures of the order of 150 to 160° C., the problem becomes particularly acute, as stated above, if the reaction is sought to be carried out at temperatures in excess of 200° C. While it is possible, to be sure, to dissolve the high melting polyols in organic solvents which are non-reactive with ethylene oxide or propylene oxide, and then carry out the oxyalkylation, such practices have a number of undesirable features among which is the necessity for the removal of the solvents after the oxyalkylation reaction, a procedure which in most cases is cumbersome, difficult or uneconomical.

It has now been discovered that such liquid oxyalkylated high-melting polyols, namely, polyols melting at a temperature of at least 200° C., and usually in the range up to about 270° C., can very simply and effectively be prepared by the procedures described below. We have found that high-melting polyols may be dissolved in low-melting polyols or in normally liquid polyols to produce mixtures the melting point of which is not in excess of 170° C., and that such mixtures of polyols can readily be oxyalkylated to produce liquid oxyalkylation products, following techniques and procedures per se well known in the art, utilizing the oxyalkylating agent in gaseous form and under pressure and adding it in gradual or incremental amounts, to produce products which are highly useful for the purposes described above, the oxyalkylation reactions being easy to control and not introducing operational hazards.

In order to achieve the full benefits of this aspect of our invention, it is necessary (a) that the mixture of the high-melting polyol or polyols and the normally liquid or low-melting polyol be entirely liquid or an essentially clear liquid at a temperature not exceeding 170° C., (b) that the oxyalkylation of said liquid mixture be carried out at a temperature not exceeding 170° C., (c) that the said gaseous oxyalkylating agent be added gradually or in gradual or incremental amounts, and (d) that the oxyalkylating agent be utilized in such proportions, in relation to the liquid mixture of polyols, that the final oxyalkylated polyol mixture be a liquid not only at the temperature at which the oxyalkylation reaction is carried out but, also, at ordinary room temperatures. For instance, if the oxyethylating agent is added to the polyol mixture prior to the latter being in an essentially fully liquid condition, and if too much of the oxyalkylating agent is added, undesired separations may occur during the reaction or subsequently during storage of the oxyalkylated polyol, prior to ultimate use. Furthermore, the addition of too much oxyalkylating agent results in the production of oxyalkylation reaction products which are solids at ordinary room temperatures, such normally solid oxyalkylation products being worthless for the particular purposes for which our normally liquid oxyalkylation products are especially adapted, namely, for the production of polyesters for use in the manufacture of polyurethane foams, especially those of the rigid type.

Among the normally liquid polyols and the polyols which have low-melting points, namely, those which melt at temperatures not in excess of 100° C., are, for instance, glycerol, sorbitol, diglycerol and higher polyglycerols, ethylene glycol, diethylene glycol, propylene glycol, 1,3-butylene glycol, 1,5-pentanediol and trimethylolpropane, as well as oxyalkylated polyols prepared by either this invention or by methods heretofore known in the art. It is particularly advantageous to use as the normally liquid or low-melting polyol those containing at least three hydroxy groups. The mixtures of the high-melting polyol and the normally liquid or low-melting polyol which are subjected to oxyalkylation should contain a minimum of 20% and better still a minimum of 40% by weight of the high-melting point polyol and depending upon the selection of the two or more different polyols falling into the aforesaid two different groups the upper limit of the high-melting point polyol may be of the order of seventy-five percent by weight or even higher.

The normally liquid reaction products of the oxyalkylation of the aforesaid mixtures of high-melting polyol and normally liquid or low-melting polyol are, of course, mixtures of the oxyalkylated components. The exact chemical constitution of such mixtures of oxyalkylation reaction products of the polyols will vary, depending upon a variety of factors including the particular polyols selected and the exact proportions thereof used. In general, it may be stated that the normally liquid reaction mixtures will include oxyalkylated normally liquid polyols or low-melting polyols with the oxyalkylated high-melting polyol but, in addition, there will also be present, in the usual case, small amounts of compounds which contain both the normally liquid polyol (or the low-melting polyol) and the high-melting polyol in a single molecule as diethers. The final normally liquid reaction products will contain from 10 to 22, usually from 11 to 16, milli-equivalents, per gram, of hydroxyl groups. The resulting oxyalkylation products of the mixed normally liquid or low-melting polyols and high-melting polyols have been found to be especially efficacious for the production of polyesters useful in the preparation of rigid polyurethane foams.

In the production of normally liquid oxyalkylation products, to wit, polyglycol ethers, from high-melting polyols, in which ethers the number of milli-equivalents, per gram, of hydroxyl groups is in the range of 10 to 22, it is essential, for the production of products which are especially useful for the preparation of polyesters for the manufacture of polyurethane foams, that there be a reasonable distribution of the glycol ether groups in the final polyglycol ether reaction products. This requires that, before any oxyalkylation begins, the mixture of the high- and low-melting polyols be substantially in clear liquid form. Unless this requirement is observed, the proper distribution of the glycol ether groups is not achieved. The foregoing requirement, critical to the formation of normally liquid alkylation products which have essentially optimum properties for the purposes of our present invention, does not come into consideration where normally solid oxyalkylation products are produced, as, for instance, pursuant to British Patent No. 690,355.

The oxyalkylations, so far as the techniques proper are concerned, the use of elevated pressures, and the use of catalysts of various types, bearing in mind the criteria referred to above, are per se known in the art and no patentable novelty is claimed therein per se. The mols of ethylene oxide or propylene oxide or butylene oxide, or other alkylene oxides, generally speaking, α-epoxides containing particularly from 2 to 4 carbon atoms, which are employed for each mol of the mixture of high-melting polyol and the normally liquid or low-melting polyol can be varied as desired, provided that the final oxyalkylation products are liquids at room temperature. Similarly, for instance, the oxyalkylation may be conducted with ethylene oxide alone, with propylene oxide alone, with butylene oxide alone, or with mixtures of two or more of said alkylene oxides; or, for instance, propylene oxide may first be used followed by ethylene oxide, or ethylene oxide may first be used followed by propylene oxide. As previously indicated, ethylene oxide and propylene oxide are the especially desired oxyalkylating agents. However, in the broader aspects of the invention, other oxyalkylating agents can be used. In carrying out the oxyalkylation reactions, in accordance with our present invention, it is especially important, if the full advantages are to be achieved, to add the oxyalkylating agent gradually or incrementally to the mixture of polyols.

The following examples are illustrative of the production of normally liquid oxyalkylation products in accordance with our invention. It will be understood that, in the light of the guiding principles disclosed herein, numerous other examples can readily be evolved without in any manner departing from the principles and the teachings set forth herein. Different polyols, as well as mixtures of two or more polyols falling into each of the two groups, and varying proportions of the polyol can be selected to provide novel products having new and interesting properties. All parts listed are by weight.

Example 1

820 parts trimethylolethane (M.P. 202° C.), 820 parts trimethylolpropane (M.P. 58° C.), and 2 parts potassium hydroxide were mixed together and placed in an autoclave heated to a temperature of 135° C. There were then introduced into said mixture in the autoclave a total of 1160 parts of gaseous ethylene oxide in gradual amounts over a period of about 3 hours, a pressure of about 25 pounds per square inch being maintained in the autoclave during the reaction. The reaction product was a clear liquid, slightly yellow at room temperature, and had an hydroxyl value of 14.2 meq./gm.

Example 2

492 parts technical pentaerythritol (M.P. 262° C.), 1148 parts trimethylolpropane, and 1 part potassium hydroxide were mixed together and heated to 150° C. in an autoclave. There was then passed into the melted mixture in said autoclave a total of 1160 parts of ethylene oxide in the manner described in Example 1 at a temperature of about 135° C. at 25 to 50 pounds per square inch pressure. The resulting reaction product was a light, clear viscous liquid at room temperature and had an hydroxyl value of 13.9 meq./gm.

Example 3

700 parts pentaerythritol, 700 parts anhydrous glycerol, and 1 part potassium hydroxide were mixed together and heated to 150° C., forming a molten mixture. Said mixture was then placed into an autoclave maintained at 135° C. and 1400 parts of gaseous ethylene oxide were gradually added over a period of about 2 hours while maintaining a pressure of 25 to 50 pounds per square inch. The reaction product was a yellow, viscous liquid at room temperature and had an hydroxyl value of 15.4 meq./gm.

Example 4

1660 parts penaterythritol, 223 parts glycerol, and 1 part potassium hydroxide were mixed together and heated to a temperature of 170° C., placed in an autoclave, and reacted with 1520 parts of gaseous ethylene oxide added gradually over a period of about 3 hours at a temperature of approximately 170° C. at 30 pounds per square inch pressure. The reaction product was a liquid having an hydroxyl value of 11.0 meq./gm.

It may be pointed out, in connection with the reaction products of Examples 3 and 4, that said reaction products are of a type in which all of the hydroxyl groups are in the form of primary hydroxyl groups. This is particularly advantageous in connection with the production of polyesters for use in polyurethane foams.

Example 5

937 parts pentaerythritol, 313 parts glycerol, and 1 part potassium hydroxide were mixed together, in an autoclave, and heated to 150° C. while stirring. Into the molten mixture were added 1338 parts of ethylene oxide over a period of 5 hours, at a reaction temperature of about 135° C. and at a pressure of 25 to 50 pounds per square inch. The reaction product was a liquid at room temperature and contained 14.6 meq./gram hydroxyl groups.

As stated above, the normally liquid oxyalkylation products of the mixtures of high-melting and lower melting point polyols, produced as described above, have been found to be especially efficacious for the production of polyesters which, in turn, are highly useful in the preparation of polyurethanes, particularly rigid polyurethane foams. As illustrative of this aspect of our invention, the aforesaid oxyalkylation products are reacted with polycarboxylic acids, or the anhydrides thereof, as, for instance, adipic acid, trimellitic acid, terephthalic acid, naphthalene dicarboxylic acid, phthalic anhydride, or mixtures of such or other polycarboxylic acids. The following examples are given by way of illustration of the preparation of polyesters and of polyurethane foams from the normally liquid oxyalkylation products produced as described above.

Example 6

35.56 parts of the oxyalkylation product of Example 5 and 10.064 parts of phthalic anhydride were reacted at a temperature of about 250° C. until the hydroxyl number was about 480. The resulting ester product, at room temperature, was a moderately viscous liquid.

Example 7

(a) A mixture was prepared containing 40.5 parts of the ester product of Example 6, 0.25 part of Silicon X521 (Carbide and Carbon Chemicals Corporation), 0.05 part of "Cab-O-Sil" and 0.25 part of $N,N,N^1,N^1$-tetramethyl-1,3-butenediamine.

(b) A prepolymer was prepared by mixing, in the absence of moisture, 75 parts of toluene diisocyanate (80:20 isomer ratio) with 25 parts of the ester product of Example 6. To 50 parts of said prepolymer, cooled below room temperature, 17 parts of trichlorofluoromethane as a blowing agent were added. The resulting mixture was then addde, with rapid stirring, to the mixture of part (a) hereof. After 10 seconds, the resulting homogeneous mixture was poured into a cardboard mold. An excellent, fine-celled, rigid foam having very good physical properties was formed.

It may be noted that it is critical to our invention that the oxyalkylation products be normally liquid at room temperatures; and, if the full benefits of our invention are to be obtained, that the said oxyalkylation products contain from 10 to 22 milli-equivalents, per gram, of hydroxyl groups. Thus, for instance, if normally solid oxyalkylation products of mixtures of polyols, as shown in the aforesaid British patent, are reacted with polycarboxylic acids or anhydrides thereof, such as phthalic anhydride, and the resulting esters are sought to be reacted with polyisocyanates, such as tolylene diisocyanate, together with other conventional ingredients used in making polyurethane foams, the foams collapse and the final products are worthless as polyurethane foams.

What we claim as new and desire to protect by Letters Patent of the United States is:

1. In a method of obtaining a normally liquid oxyalkylation product of a high-melting polyol, said high-melting polyol having a melting point of at least 200° C. and selected from the group consisting of mannitol, erythritol, pentaerythritol, dipentaerythritol, tripentaerythritol and higher pentaerythritols, trimethylolethane, and 1,3-propane-diol-2-hydroxy-methyl-2-methyl, said oxyalkylation product containing from 10 to 22 milli-equivalents, per gram, of hydroxyl groups, the steps which comprise admixing said high-melting polyol with a lower melting polyol, said latter polyol being selected from the group consisting of glycerol, sorbitol, diglycerol and higher polyglycerols, ethylene glycol, diethylene glycol, propylene glycol, 1,3-butylene glycol, 1,5-pentanediol, and trimethylolpropane, the high-melting point polyol being soluble in said lower melting point polyol to produce a mixture of polyols which contains at least 20% by weight of said high-melting polyol and which mixture is an essentially clear liquid at a temperature not exceeding 170° C., and oxyalkylating said mixture in a liquid state by admixing the same, under a pressure in excess of atmospheric pressure and at a temperature not exceeding 170° C., with an oxyalkylating agent in an amount to produce a final normally liquid oxyalkylation product of said mixture of polyols containing from 10 to 22 milli-equivalents, per gram, of hydroxyl groups.

2. The method of claim 1, wherein the oxyalkylating agent is ethylene oxide.

3. The method of claim 1, wherein the oxyalkylating agent is propylene oxide.

4. In a method of obtaining a normally liquid oxyalkylation product of a high-melting polyol, said high-melting polyol having a melting point of at least 200° C. and selected from the group consisting of mannitol, erythritol, pentaerythritol dipentaerythritol, tripentaerythritol and higher pentaerythritols, trimethylolethane, and 1,3-propane-diol-2-hydroxy-methyl-2-methyl, said oxyalkylation product containing from 10 to 22 milli-equivalents, per gram, of hydroxyl groups, the steps which comprise admixing said high-melting polyol with a lower melting point polyol, said latter polyol being selected from the group consisting of glycerol, sorbitol, diglycerol and higher polyglycerols, ethylene glycol, diethylene glycol, propylene glycol, 1,3-butylene glycol, 1,5-pentanediol, and trimethylolpropane, the high-melting polyol being soluble in said lower melting point polyol to produce a mixture of polyols which contains at least 40% by weight of said high-melting polyol and which mixture is an essentially clear liquid at a temperature not exceeding 170° C., and oxyalkylating said mixture in a liquid state by gradual addition thereto, under a pressure in excess of atmospheric pressure and at a temperature not exceeding 170° C., of an oxyalkylating agent containing from 2 to 4 carbon atoms in an amount to produce a final normally liquid oxyalkylation product of said mixture of polyols containing from 10 to 22 milli-equivalents, per gram, of hydroxyl groups.

5. The method of claim 4, wherein the oxyalkylating agent is ethylene oxide and the high-melting polyol is trimethylolethane.

6. The method of claim 4, wherein the oxyalkylating agent is ethylene oxide and the high-melting polyol is a pentaerythritol.

7. A normally liquid oxyalkylation reaction product of a mixture of (a) a high-melting polyol having a melting point of at least 200° C. and selected from the group consisting of mannitol, erythritol, pentaerythritol, dipentaerythritol, tripentaerythritol and higher pentaerythritols, trimethylolethane, and 1,3-propane-diol-2-hydroxy-methyl-2-methyl, with (b) a lower melting point polyol selected from the group consisting of glycerol, sorbitol, diglycerol and higher polyglycerols, ethylene glycol, diethylene glycol, propylene glycol, 1,3-butylene glycol, 1,5-pentanediol, and trimethylolpropane, the high-melting polyol being soluble in said lower melting point polyol, said high-melting point polyol constituting from 20 to 75%, by weight, of said mixture of polyols, said normally liquid oxyalkylation product of said mixture of polyols containing from 10 to 22 milli-equivalents, per gram, of hydroxyl groups.

8. The product of claim 7, wherein the oxyalkylation reaction product is an ethylene oxide reaction product of said mixture of polyols.

9. The product of claim 7, wherein the oxyalkylation reaction product is a propylene oxide reaction product of said mixture of polyols.

10. The product of claim 7, wherein the high-melting polyol is trimethylolethane and the oxyalkylation reaction product is an ethylene oxide reaction product of said mixture of polyols.

11. The product of claim 7, wherein the high-melting polyol is a pentaerythritol and the oxyalkylation reaction product is an ethylene oxide reaction product of said mixture of polyols.

References Cited by the Examiner

UNITED STATES PATENTS

| | | | |
|---|---|---|---|
| 2,450,079 | 9/1948 | Brown | 260—615 |
| 2,527,970 | 10/1950 | Sokol | 260—615 |

(Other references on following page)

UNITED STATES PATENTS

| | | | |
|---|---|---|---|
| 2,673,882 | 3/1954 | Griffin | 260—615 |
| 2,766,292 | 10/1956 | Monson et al. | 260—615 |
| 2,902,478 | 9/1959 | Anderson | 260—615 X |
| 3,023,192 | 2/1962 | Shivers | 260—75 |
| 3,025,266 | 3/1962 | Huffman | 260—75 |
| 3,050,477 | 8/1962 | Gmitter et al. | 260—2.5 |
| 3,062,757 | 11/1962 | Dombrow et al. | 260—2.5 |
| 3,078,315 | 2/1963 | Steele et al. | 260—615 |
| 3,110,737 | 11/1963 | De Groote et al. | 260—615 |

FOREIGN PATENTS

| | | |
|---|---|---|
| 690,355 | 4/1953 | Great Britain. |

LEON ZITVER, *Primary Examiner.*

DONALD E. CZAJA, *Examiner.*

J. J. KLOCKO, B. HEFLIN, H. T. MARS,
*Assistant Examiners.*